United States Patent [19]
Leader

[11] Patent Number: 5,417,293
[45] Date of Patent: May 23, 1995

[54] SINGLE PASS CONTINUOUS FEED SPRIGGER

[76] Inventor: Ronald W. Leader, Rte. 1, Box 33, Seneca, Mo. 64865

[21] Appl. No.: 992,128

[22] Filed: Dec. 17, 1992

[51] Int. Cl.$^6$ ............................................. A01B 39/20
[52] U.S. Cl. .................................. 172/721; 172/163; 172/195; 172/497; 172/765
[58] Field of Search ............... 172/444, 439, 497, 484, 172/195, 196, 163, 754, 759, 760, 765, 770, 771, 745, 721, 732, 733

[56] References Cited

U.S. PATENT DOCUMENTS

| | | | |
|---|---|---|---|
| 506,236 | 10/1893 | Kelly | 172/760 |
| 1,067,347 | 7/1913 | Kelly et al. | 172/759 |
| 1,139,840 | 5/1915 | Boyer | 172/760 |
| 1,871,529 | 8/1932 | Karshner . | |
| 2,580,480 | 1/1952 | Strehlow et al. | 172/484 |
| 2,601,609 | 6/1952 | Harbison et al. | 172/444 |
| 2,637,262 | 5/1953 | Altgelt | 172/196 |
| 2,661,708 | 12/1953 | Pittman | 111/1 |
| 2,674,170 | 4/1954 | Morkoski | 172/484 |
| 2,713,835 | 7/1955 | Pittman | 111/61 |
| 2,757,594 | 8/1956 | Tanke | 172/754 |
| 2,887,075 | 5/1959 | Linkogel | 111/3 |
| 2,949,083 | 8/1960 | Knowles | 111/3 |
| 3,026,001 | 3/1962 | Landgraf | 221/42 |
| 3,327,786 | 6/1967 | Meyer | 172/484 |
| 3,708,019 | 1/1973 | Ryan | 172/497 |
| 3,939,785 | 2/1976 | Duffy | 111/3 |
| 4,088,083 | 5/1978 | Dail, Jr. | 111/3 |
| 4,208,944 | 6/1980 | Dreyer et al. | 172/484 |
| 4,762,181 | 8/1988 | Cox | 172/196 |
| 4,909,335 | 3/1990 | Walt, Jr. | 172/196 |
| 5,082,064 | 1/1992 | Landoli et al. | 172/196 |

*Primary Examiner*—Clifford D. Crowder
*Assistant Examiner*—Michael A. Neas
*Attorney, Agent, or Firm*—Head & Johnson

[57] ABSTRACT

In a sprigger a tiller aligned with a plow and weighted to disks. The tiller breaks the ground forming narrow grooves into which fertilizer may be distributed and a plow following behind, preferably at a depth less than that of the tiller, forms a substantially flat bottomed furrow in the path of the groove. A plurality of chutes are aligned, one over each of the furrows, and a separator mounted above the chutes loosens the sprigs and distributes them through the chutes into the furrows. Weighted disks shift the ridges of loose soil over the sprigs and trailing tires on the sprigger transport carriage compact the earth over the sprigs. Each of the plows operates in a three-stage fashion, with V-shaped blades cutting the horizontal path through the earth, a lifting wedge raising the cut earth at a modest angle above the furrow and a pair of curling plates having convex surfaces curling the uplifted earth into ridges on either side of the plow to provide a clean, consistent furrow. Each tiller and plow combination is mounted on a separate tension device so that, if the plowing mechanism meets an obstacle that could cause damage to the mechanism, they are free to rotate clear of the obstacle and then return under bias of the tension mechanism to the plowing position. A hydraulic system coordinates operation of a beater system, including a separator and chain conveyors which feed sprigs into the separator, with rotation of the transport tires to provide even distribution of sprigs in bushels per acre.

13 Claims, 8 Drawing Sheets

SINGLE PASS CONTINUOUS FEED SPRIGGER

BACKGROUND OF THE INVENTION

This invention relates generally to farming equipment and more particularly concerns equipment for planting grass roots or clippings in compacted or untilled soil, fallow ground or established vegetation.

The process of planting Bermuda grass roots or clippings or the like normally involves the breaking and furrowing of ground, fertilization of the broken ground, distribution of the roots or clippings into the fertilized ground, covering over of the sprigged ground with loose soil and compaction of the loose soil over the roots or clippings. Equipment presently known often requires more than one pass over the ground to be sprigged to accomplish all of these steps. Some equipment has been developed to accomplish these tasks in a single pass, but usually more than one operator is required to properly use the equipment. In addition, the known equipment often causes undesirable disruption of the ground surface. Furthermore, the feed rate of sprigs to the ground is generally a function of an independent drive mechanism operating the feed system and, therefore, it is necessary to maintain the motion of the equipment across the ground at a constant speed in order to maintain a constant bushels-per-acre distribution of sprigs over the ground.

It is, therefore, an object of this invention to provide a sprigger than can be operated by one person. It is a further object of this invention to provide a sprigger which distributes grass roots or clippings at a rate corresponding to the rate of movement of the sprigger so as to achieve a constant bushels-per-acre feed rate regardless of sprigger speed. A further object of this invention is to provide a sprigger which causes minimal disruption to the ground surface being sprigged. Another object of this invention is to provide a sprigger which permits all of the steps necessary to plant live grass roots or clippings in compacted or untilled soil, fallow ground or established vegetation to be accomplished in a single pass of the equipment over the ground.

SUMMARY OF THE INVENTION

In accordance with the invention, a sprigger is provided which includes a plurality of plowing mechanisms consisting of a tiller aligned with a plow and weighted to disks. The tiller breaks the ground forming narrow grooves into which fertilizer may be distributed and the plow following behind, preferably at a depth less than that of the tiller, forms a substantially flat bottomed furrow in the path of the groove. A plurality of chutes are aligned, one over each of the furrows, and a separator mounted above the chutes loosens the sprigs which are fed into the separator and distributes them through the chutes into the furrows. The trailing weighted disks then shift the ridges of loose soil over the distributed sprigs and a trailing tire, being part of the sprigger transport carriage, compacts the earth over the sprigs, there being one tire provided for each plowing mechanism and furrow. The sprigger is specially characterized in that each of the plows operates in a three-stage fashion, the V-shaped blades cutting the horizontal path through the earth, a lifting wedge raising the cut earth at a modest angle above the furrow and a pair of curling plates having convex surfaces curling the uplifted earth into ridges on either side of the plow to provide a clean, consistent furrow. The invention is further characterized in that each tiller and plow combination is mounted on a separate tension device so that, if the plowing mechanism meets an obstacle that could cause damage to the mechanism, the tiller and plow are free to rotate clear of the obstacle and then return under bias of the tension mechanism to the plowing position. The invention is also specially characterized in that its hydraulic system operating the beater system constituted by the separator and chain conveyors which feed sprigs into the separator and the rotation of the transport tires of the sprigger are coordinated to provide even distribution of sprigs in bushels per acre.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 1:
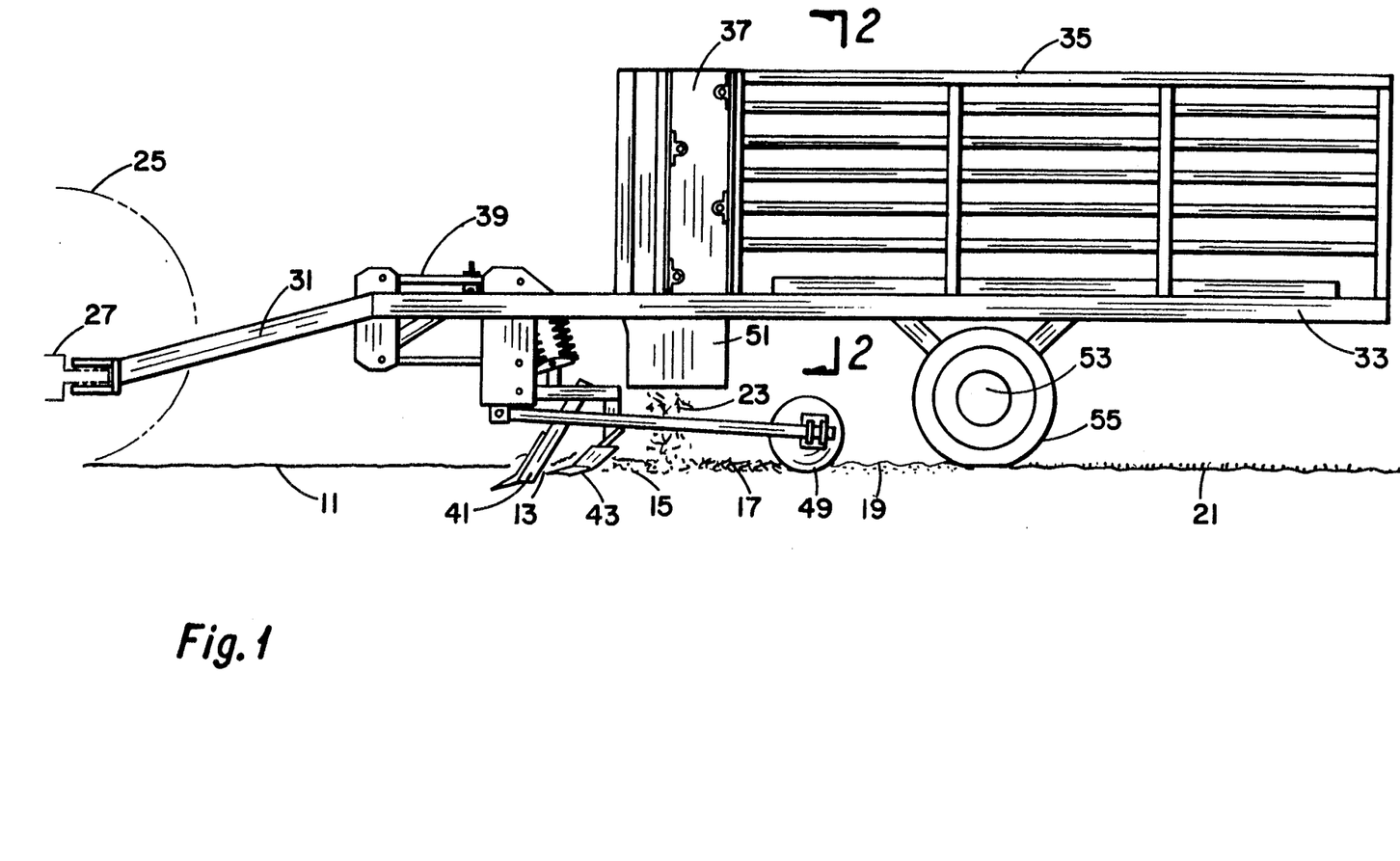
FIG. 1 is a side elevation view of a preferred embodiment of the sprigger.

Turning first to FIG. 1, a preferred embodiment of a sprigger according to the present invention is illustrated. The sprigger is towed by a motorized vehicle, such as a tractor having treads 25 and a hitch 27, connected to a hitch frame 31 of the sprigger. The sprigger main frame 33 is generally welded to and extends rearwardly from the hitch frame 31. Side panels 35 extend rearwardly on the main frame 33 from a separator assembly 37 which extends across the forward portion of the main frame 33. A pivot assembly 39 mounted on the main frame 33 forward of the separator assembly 37 supports a plurality of plowing mechanisms which each include a tiller 41 mounted forwardly of a plow 43, each plowing mechanism in turn being forward of one of a plurality of chutes 51 mounted beneath the separator assembly 37. Each plowing mechanism further includes a disk assembly having a weighted disk 49 disposed between its respective chute 51 and the sprigger carriage assembly 53. The carriage assembly 53 includes a plurality of pneumatic tires 55, one associated with each plowing mechanism. As the towing vehicle 25 passes across untilled soil 11, the tillers 41 knife through the soil, fracturing the soil and spreading existing vegetation with minimal disruption to the surface, to provide narrow grooves in the tilled soil 13. Liquid or dry fertilizer may then be deposited into the grooves and below the anticipated root zone of the new roots or clippings by applicator mounted between the tillers 41 and the plows 43 (not shown). The plows 43, which are broader than and not as deep in the soil as the tillers 41, follow behind the tillers 41 leaving furrows between ridges of soil 15 for receiving sprigs 23 dispensed from the chutes 51. The sprigged soil 17 is then covered with loose soil 19 by the disks 49 which pass through the ridges at an angle oblique to the sprigger travel path. Finally, the pneumatic tires 55 roll over the loose soil 19, providing compacted soil 21 over the planted sprigs to prevent loss of soil moisture and air movement within the soil.

Figure 2:
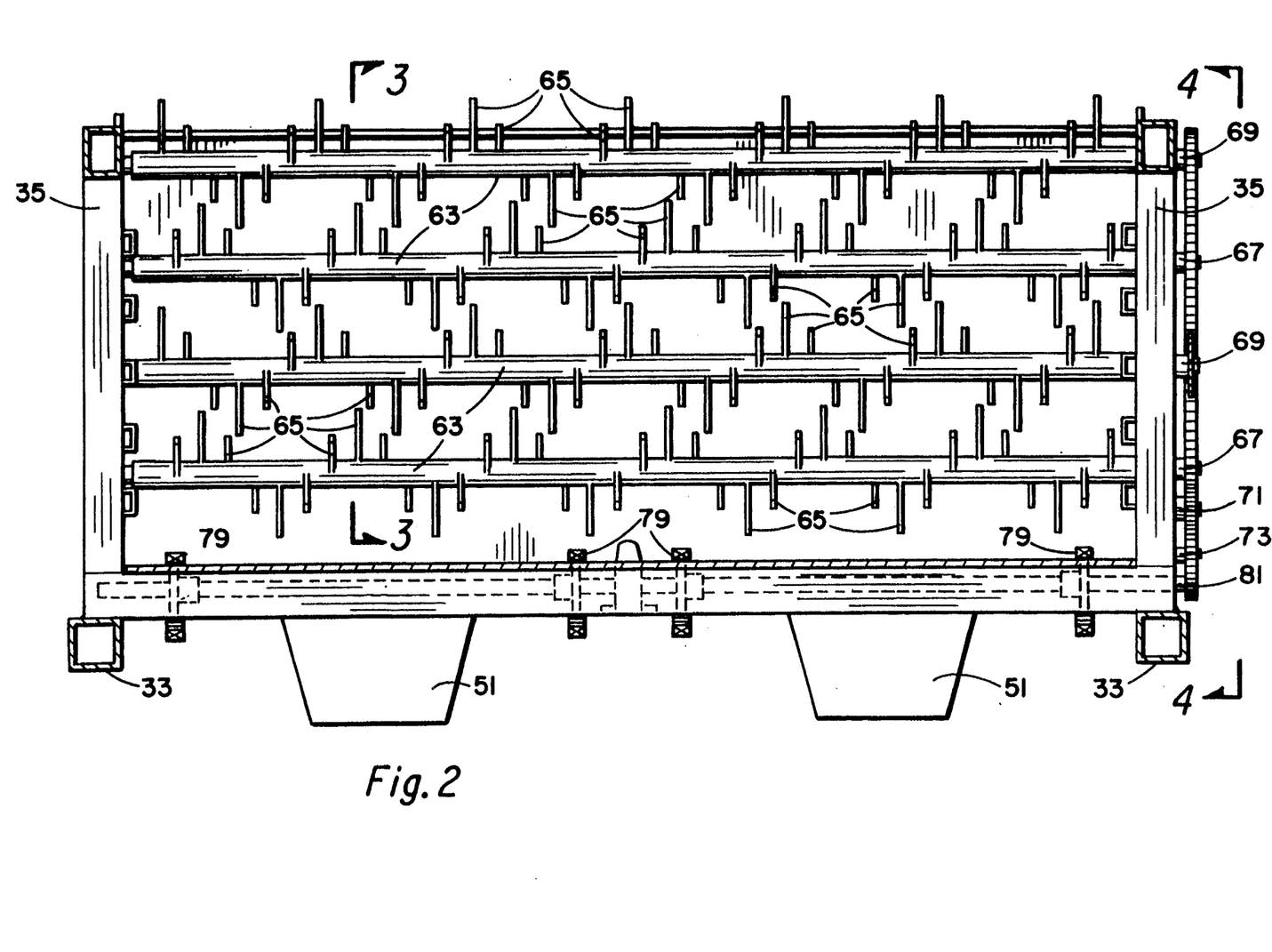
FIG. 2 is a cross sectional view taken along the line 2—2 of FIG. 1.
Figure 3:
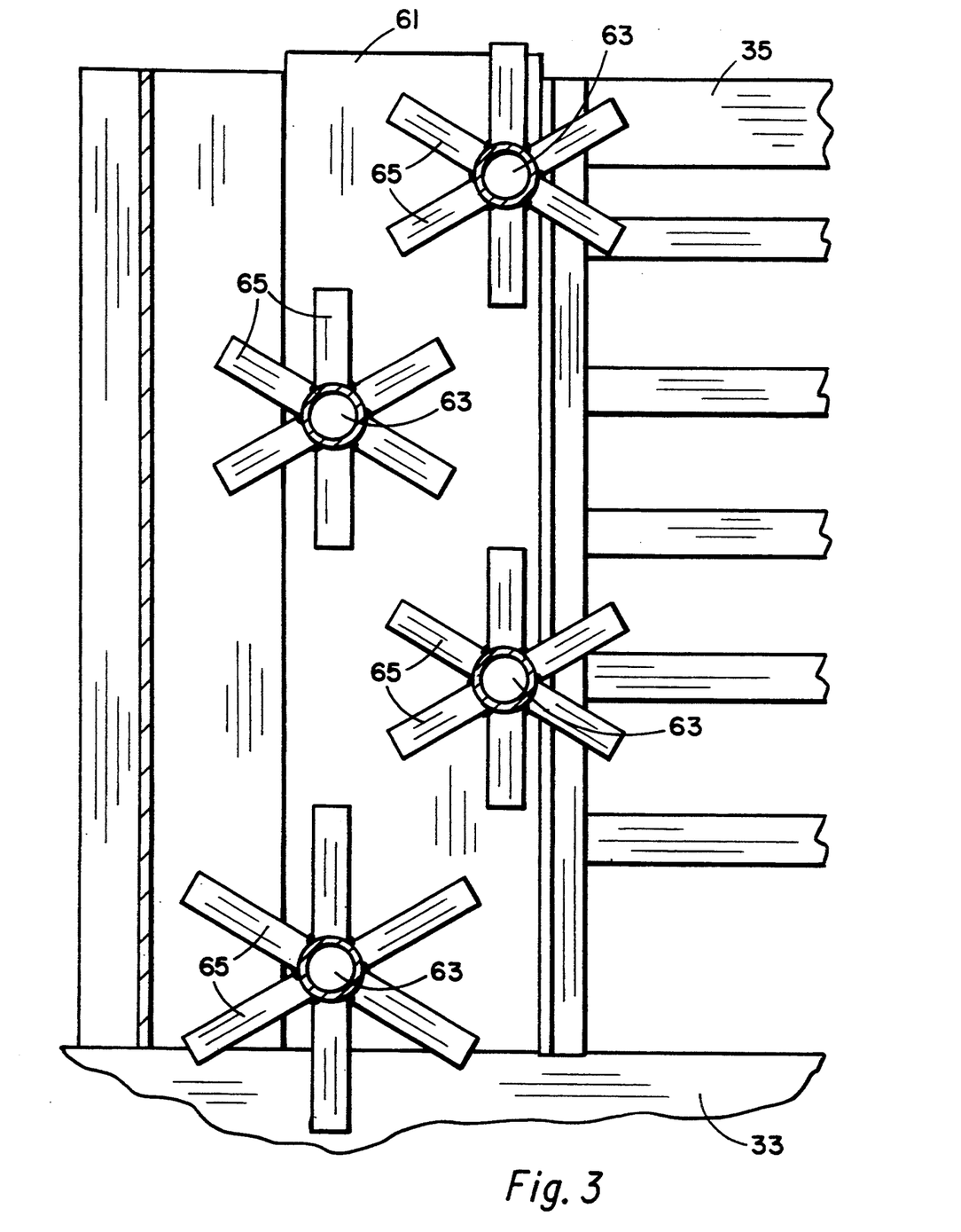
FIG. 3 is a cross-sectional view taken along the line 3—3 of FIG. 2.
Figure 4:
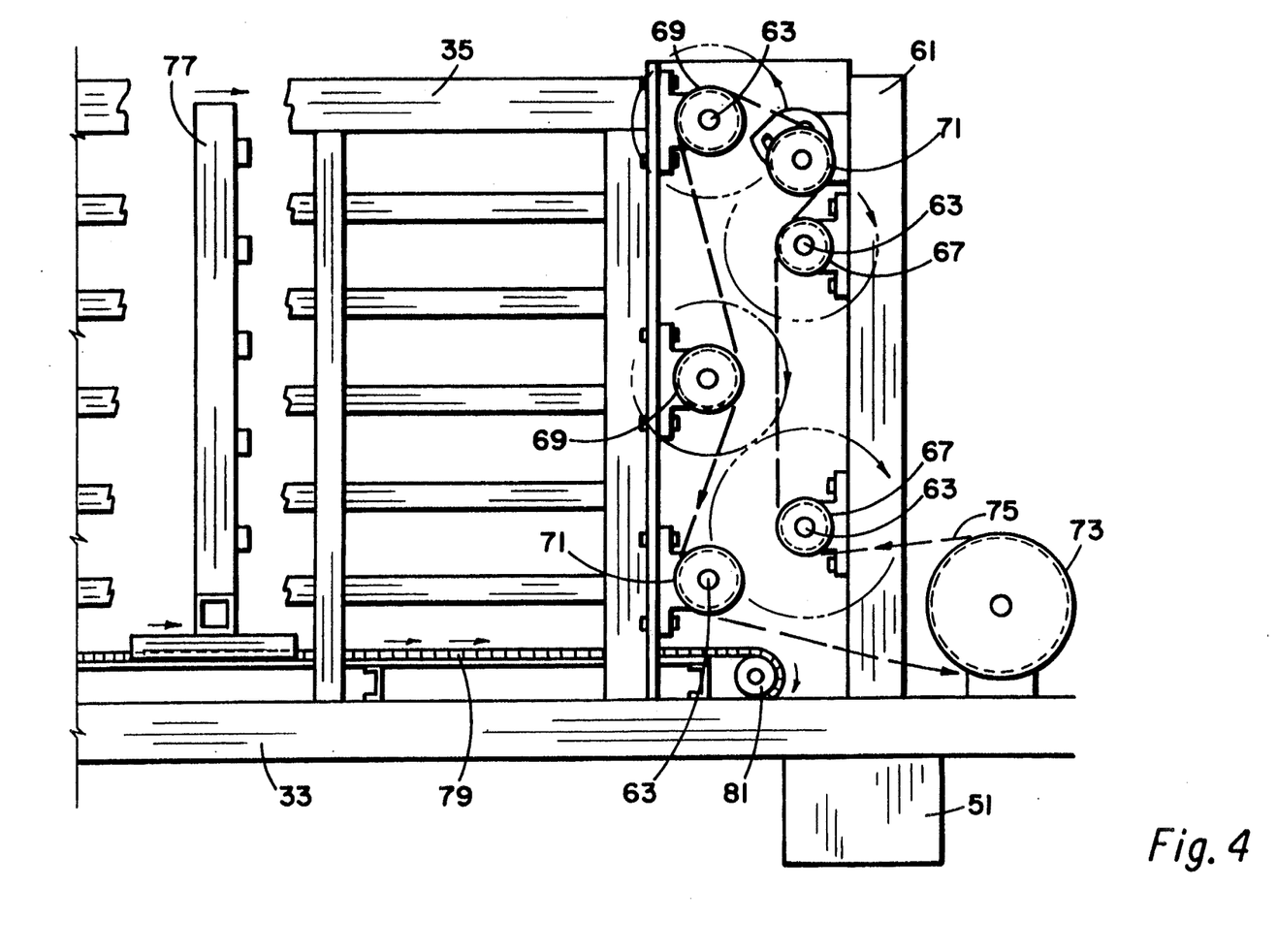
FIG. 4 is a side elevation view with parts broken away taken along the line 4—4 of FIG. 2.

Looking now at FIGS. 2, 3, and 4, the separator assembly 37 includes four beater axles 63, two forwardly and two rearwardly across the separator frame 61, each axle 63 having a plurality of radial beaters 65 sequentially angularly displaced at intervals, typically at approximately 60 degrees angularly and two inches internally, along its length. As best illustrated in FIG. 4, the axles 63 are connected to a drive system mounted on one exterior side of the separator frame 61 which consists preferably of a pair of small sprockets 67 on the forward axles 63 and a pair of large sprockets 69 on the rear axles 63 so that the forward axles 63 will rotate at a higher speed than the rear axles 63. Guide sprockets 71 provide appropriate tension and directional operation and a drive sprocket 73 drives an endless chain 75 connecting the sprockets 67, 69, 71 and 73. As viewed in FIG. 4, the uppermost large sprocket 69 rotates in counterclockwise direction and the remaining small and large sprockets 67 and 69 rotate in clockwise direction. The sprigs (not shown), stored for planting between the side panels 35, are transported to the beaters 65 by an end gate 77 and several chain conveyors 79 on which the end gate 77 is carried. The sprigs drop through the chutes 51 after being separated by the beaters 65. The chain conveyors 79 are driven by conveyor wheels 81 which in turn are rotated by a common drive (not shown), such as a hydraulic motor or pumps mounted at any convenient location on the sprigger or towing vehicle. Preferably, the motor is connected to the axle of the carriage assembly 53 transporting the sprigger so that the operation of the separator assembly 37 and the chain conveyors 79 can be coordinated to the travel of the sprigger, as will hereinafter be explained.

Figure 5:
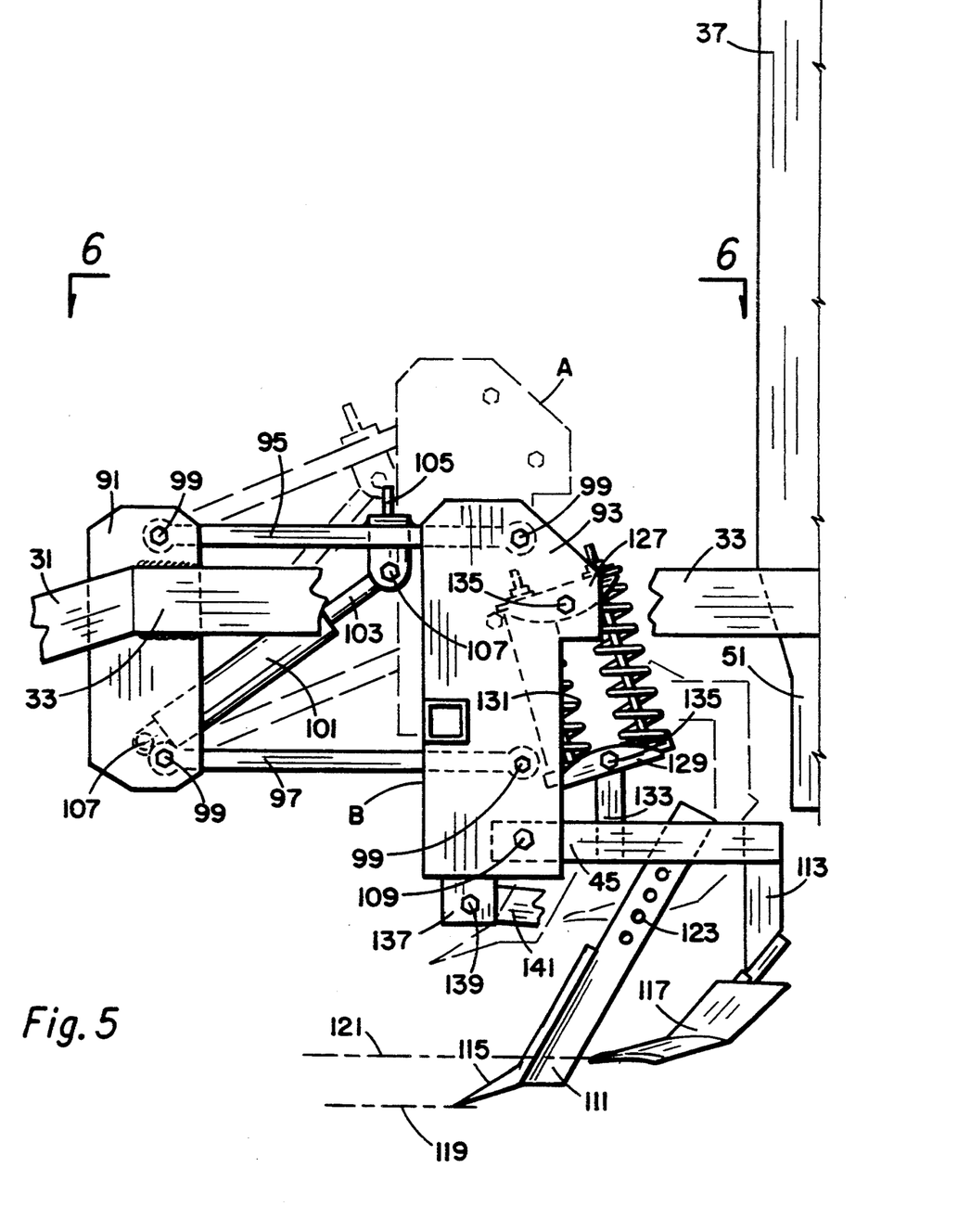
FIG. 5 is an exploded side elevation view of the plowing mechanism illustrated in FIG. 1 illustrating the disengaged and operational modes of the plowing mechanism.
Figure 6:
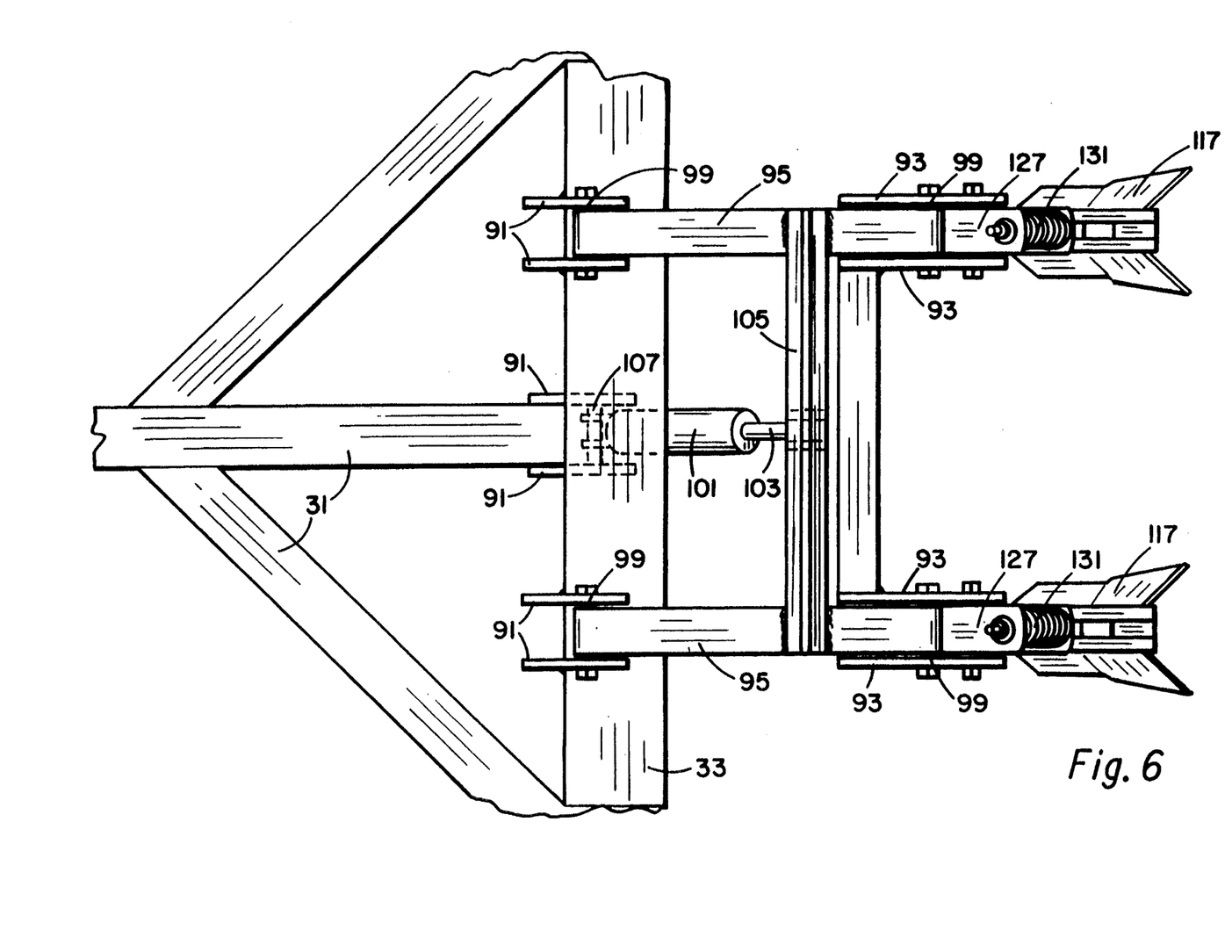
FIG. 6 is a top view taken along the lines 6—6 of FIG. 5.

Turning now to FIGS. 5 and 6, the novel arrangement of the plowing mechanisms can be understood. The pivot assembly 39 as shown in FIG. 1 includes pairs of plates 91 fixed to the main frame 33, perhaps by welding as shown, and pairs of rotating plates 93 pivotally linked to the fixed plates 91 by upper and lower parallel arms 95 and 97, perhaps of ¾ inch bar stock, journalled on pivot pins 99 extending between the pairs of plates 91 and 93. An hydraulic cylinder 101 is pivotally connected to the lower portion of one pair of fixed plates 91 and the piston rod 103 is pivotally connected to a T-bar 105 connecting the upper arms 95 at a point proximate the rotating plates 93. During operation of the hydraulic cylinder 101 and piston rod 103, the plates 93 rotate in parallelogram relation to the fixed plates 91 and arms 95 and 97, remaining in constant relationship to their own axes. A plow arm 45 is pivotally connected at a forward end between each pair of rotating plates 93 by a pivot pin 109. A tiller bar 111, fixed at approximately an intermediate point on the plow arm 45, and a plow bar 113, fixed to the rear end of the plow arm 45, extend downwardly to a tiller 115, typically 2½ to 3 inches wide and having its lower portion angling forward, and a plow 117, respectively. Preferably, the tiller depth 119 is below the plow depth 121 and extends below vegetative root zones and/or compaction zones of the soil. The depth of the tiller 115 can be adjusted by aligning of the appropriate hole 123 in the tiller bar 111 with a hole in the arm 45 and inserting a bolt through the aligned holes. To maintain the tiller 115 and plow 111 of each plowing mechanism in appropriate relation to the soil, a tension assembly is provided on each plowing mechanism which includes top and bottom brackets 127 and 129 separated by a pair of recoil springs 131. The top brackets 127 are pivotally connected between pairs of rotating plates 93 and the bottom brackets are connected to linking rods 133 which are in turn connected to the plow arms 45 by pivot pins 135. The lengths of the springs 131 and the connecting rods 133 are selected so that, when the springs 131 are in their uncompressed state, their plow arms 45 are in a substantially horizontal position. The rotating plates 93 also have pivot plates 137 fixed to their lower ends and pivot pins 139 between pairs of pivot plates 137 connect disk arms 141 which extend rearwardly to the weighted disks 49 traveling along the soil between the chutes 51 and the tires 55 to direct loose earth over the sprigged soil.

In operation, when the piston rod 103 is extended from the hydraulic cylinder 101, the pivot assembly 37 holds the plowing mechanisms in their upper disengaged mode A as illustrated in phantom in FIG. 5. As the piston rod 103 is withdrawn into the cylinder 101, the rotating plates 93 shift downwardly to the operational mode B so that the tillers 115 and plows 117 can penetrate the soil. As the plowing operation proceeds, should any tiller 115 or plow 117 strike an obstacle that might cause damage to the equipment, the springs 131 associated with the obstructed plowing mechanism compress under the force transmitted through the linking rods 133, allowing the plowing arm 45 to rotate upwardly about its pivot pin 109 and permitting clearance of the obstruction by the tiller 115 and plow 117. When the obstruction is cleared, the arm 45 and therefore the tiller 115 and plow 117 return, under the bias of the springs 131, to the operational mode B. If one of the disks 49 associated with a plowing mechanism encounters an obstacle, it will rotate about its pin 139 to clear the obstacle. Since the disks 49 are independently mounted, the other disk 49 will fill the furrow.

Figure 7:
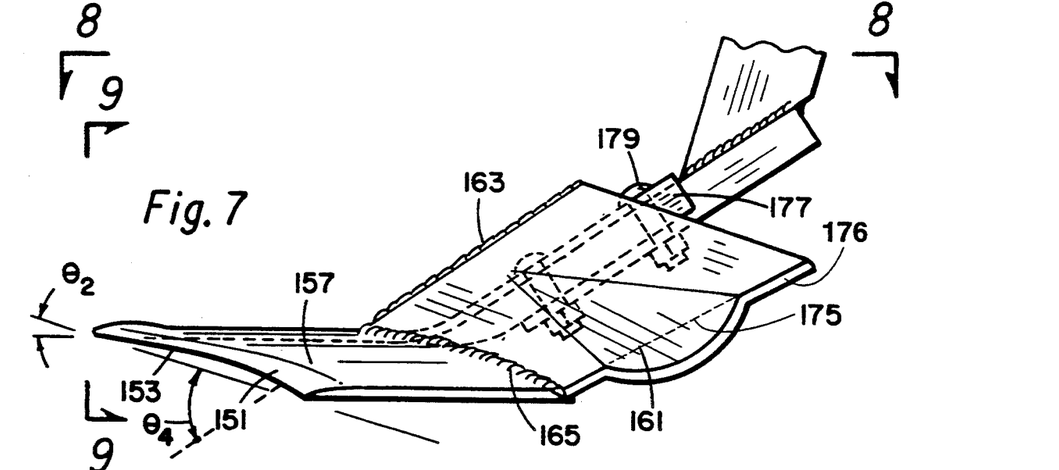
FIG. 7 is a side elevation view of a preferred embodiment of the plow for use with the present invention.
Figure 8:
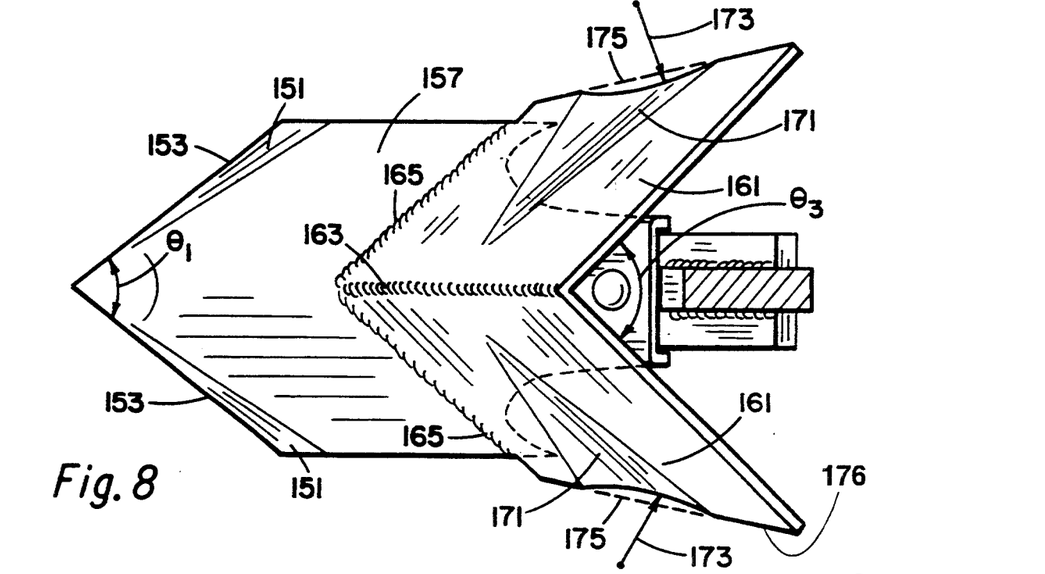
FIG. 8 is a top view taken along the line 8—8 of FIG. 7.
Figure 9:
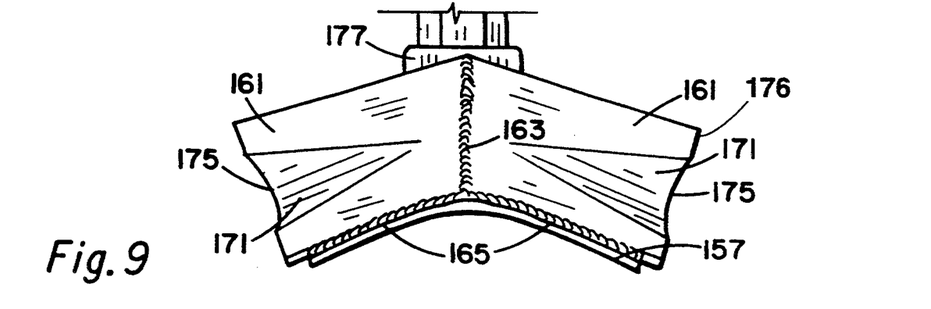
FIG. 9 is a front view taken along the line 9—9 of FIG. 7.

The novel features of the plow 117 are best understood in reference to FIGS. 7, 8 and 9. Each plow 117 has a pair of slicing blades 151 having leading edges 153 in a V-shaped arrangement, preferably at an angle $\theta_1$ of approximately 75 to 85 degrees. Slicing blades 151 extend rearwardly to form a lifting wedge 157 which extends upwardly from the plane of the leading edges 153 at a moderate angle $\theta_2$, of preferably approximately 10 to 20 degrees. The lifting wedge 157 extends rearwardly to join a pair of curling plates 161. The curling plate having first edges 163 welded to each other and second edges 165 welded to the top portion of the lifting wedge 157 so that the curling plates 161 are in a V relationship at an angle $\theta_3$, preferably approximately 90 degrees. The first edges 163 of the curling plates 161 lie at an angle $\theta_4$ extending rearwardly and upwardly in relation to the plane of the leading edges 153, preferably in the range of 30 to 60 degrees. Each of the curling plates has an outer edge 176 and a concave tapered portion 171 having a radius of convexity 173 of approximately 3 to 7 inches and a maximum chord 175 approximately equal to the radius 173, the chord of the taper 171 diminishing as the taper approaches the first edges 163 of the curling plates 161. The plow 117 further includes a mounting bracket 177 secured to the plow 117 by removable bolts 179 so that the depth of the plow 117 can be adjusted by loosening the bolts 179 and sliding the plow 117 into its desired position on the bracket 177. In operation, the plow 117 travels through the groove formed by the tiller 111 with the plane of the leading edges 153 of the slicing blades 151 substantially at a horizontal. The soil cut by the blades 151 is lifted moderately upwardly by the lifting wedge 157 and then slowly upwardly by the curling plates 161. The convex portions 171 of the plates 161 turn or curl the soil outwardly and away from the plow 117 to provide two substantially continuous and uniform rows or ridges of loose earth on either side of the substantially flat bottomed plowed furrow. This plowing operation minimizes damage to the soil surrounding the tilled and plowed area and consistently disposes loose soil in the paths of the trailing weighted disks 49 which shift the loose soil over the sprigged furrows, covering the sprigs and filling the furrows.

Figure 10:
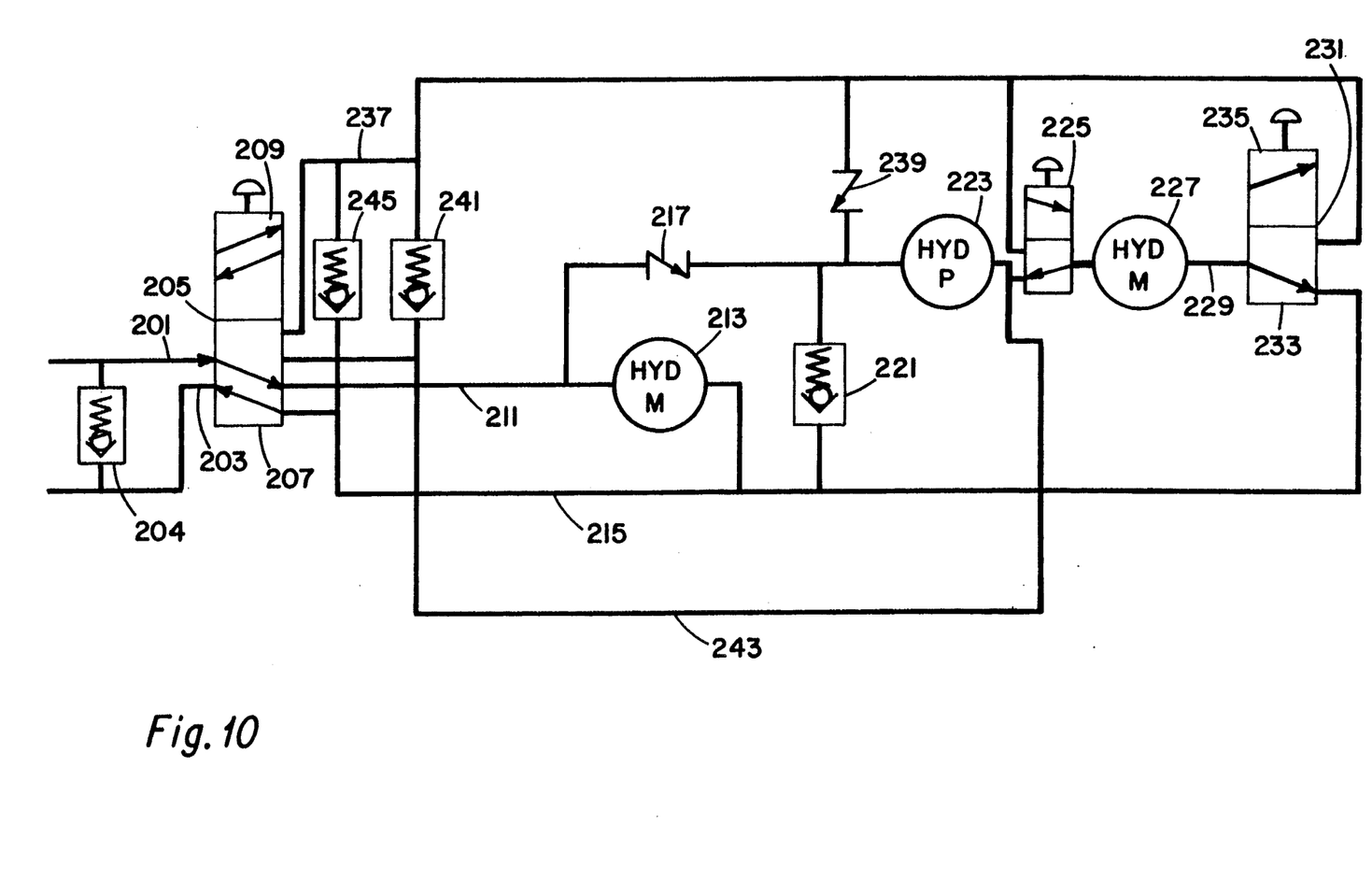
FIG. 10 is a schematic diagram of a preferred embodiment of the hydraulic control system of the sprigger.

Turning now to FIG. 10, the coordination of the operation of the separator chain drive 75 illustrated in FIG. 4 with the operation of the chain conveyors 79 and end gate 77 and the directional movement of the sprigger will be understood. A reservoir of hydraulic fluid (not shown) located conveniently on the towing vehicle or sprigger, is accessed by a fluid source 201 and a fluid return 203 which are connected by a main switch 205 having a sprigging loop 207 and an idling loop 209. A one-way flow control valve 204 between the fluids source 201 and return 203 allows pressure relief in the event the lines are blocked and the pump 223 is still operating. The main switch 205 is actuated by the movement of the pivot assembly 39 as illustrated in FIG. 5 showing the disengaged mode A and the operational mode B. When the plowing mechanisms are shifted into the operational mode B, the switch 205 connects the sprigging loop 207 via an inlet line 211 to the hydraulic beater motor 213 which drives the beater system shown in FIG. 4. The beater motor 213 is connected by the return line 215 through the main switch 205 to the hydraulic fluid reservoir return 203. The inlet line 211 is also connected through a one way flow control valve 217 by a connecting line 219 to a pressure regulator 221 which is also connected to the return line 215. The connecting line 219 also connects to the hydraulic pump 223 which operates in response to the rotation of the tires 55 of the sprigger. A connecting line 225 couples the hydraulic pump 223 through a second switch 224 to the hydraulic motor 227 which drives the conveyors 79 and end gate 77 to feed sprigs into the separator 37. Another line 229 connects the conveyor drive motor 227 to a third switch 231 having a forward position 233 and a reverse position 235. With the switch 231 in the forward position 233, the conveyor drive motor 227 is connected to the return line 215, completing the path of fluid flow to the hydraulic fluid reservoir. In this condition, when the plow mechanism is in its operating mode B, the beater motor 213, under the protection of the pressure regulator 221, is actuated to rotate the beaters 65 in the separator 37. With the switch 231 in the forward position 233, as the sprigger is forwardly advanced by the towing vehicle, the rotation of the sprigger tires 55 causes the hydraulic pump 223 to rotate and pass fluid to the hydraulic motor 227 driving the sprigger feed conveyors 79. Thus, the operation of the pump 223 is coordinated to the rate of rotation of the sprigger wheels 55 and the feed rate of the sprigs from the separator 37 into the chutes 51 is coordinated to uniformly distribute the sprigs in a constant bushels-per-acre ratio regardless of the travel speed of the sprigger.

If the plowing mechanisms are rotated to the disengaged mode A shown in FIG. 4, then the switch 205 is actuated to the idling loop 209 condition in which an inlet line 237 connected to a second one-way flow control valve 239 allows the pump 223 to continue operation as the sprigger moves forward. A one-way flow control valve 245 connected between the inlet line 237 and the return line 215 allows flow from the pump 223 back to the reservoir when the system is in the idle condition. Flow continues via a return line 243 connecting the pump 223 and the second pressure regulator 241 to the fluid return 203 of the hydraulic fluid reservoir. Thus, when the plow mechanisms are in the disengaged mode A, the beater motor 213 is disconnected and fluid flow to the conveyor drive motor 227 interrupted, discontinuing rotation of the beaters 65 and feeding of the sprigs into the separator 37.

When the third switch 231 is actuated in a reverse condition 235, and the plowing mechanism are in their disengaged mode A, flow through the hydraulic conveyor motor 227 is reversed so that the operation of the conveyors 79 is reversed thus clearing sprigs away from the separator 37. The second switch 224 allows the conveyor 79 to be returned to forward operation.

While the invention has been described in relation to a sprigger having two sets of tiller assemblies, plowing mechanisms, chutes and tires, any number of such arrangements can be spaced laterally across the sprigger at any desired interval or intervals, equal or unequal.

A preferred embodiment of the sprigger is approximately 8 feet wide by 18 to 20 feet long and is mounted on tires of approximately 8 foot circumference. The hydraulic pump is adapted to provide 8 pump revolutions per tire revolution or one pump revolution per foot of sprigger movement along the ground. This arrangement generally provides a sprigging rate of about 20 bushels of sprigs per acre, using a four row mechanism.

Thus, it is apparent that there has been provided, in accordance with the invention, a single pass continuous feed sprigger that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A plow comprising a V-shaped slicing blade, a V-shaped lifting wedge and two curling plates, said slicing blade having leading edges extending rearwardly in a horizontal V from a forward tip thereof, said lifting wedge integrally sloping upwardly at a moderate angle from said slicing blade to a rearward portion thereof and said curling plates being joined to each other at first edges thereof and to said rearward portion of said lifting wedge at second edges thereof with said first edges sloping upwardly at a severe angle from said lifting wedge to a rearward portion of said plates and said second edges forming a V substantially paralleling said slicing blade V, each of said curling plates having a rearward edge and a concave portion of varying width and depth in a forward surface thereof, the width and depth decreasing from said rearward edge to a point adjacent said first edge.

2. A plow according to claim 1, said lifting wedge sloping upwardly at an angle of approximately 10 to 20 degrees above the horizontal.

3. A plow according to claim 1, said curling plate first edges sloping upwardly at an angle of approximately 30 to 50 degrees above the horizontal.

4. A plow according to claim 1, said convex surface having a radius of convexity of approximately 3 to 7 inches and tapering to a maximum cord of approximately 3 to 7 inches.

5. A plow according to claim 2, said curling plate first edges sloping upwardly at an angle of approximately 30 to 50 degrees above the horizontal.

6. A plow according to claim 2, said convex surface having a radius of convexity of approximately 3 to 7 inches and tapering to a maximum cord of approximately 3 to 7 inches.

7. A plow according to claim 2, said curling plate first edges sloping upwardly at an angle of approximately 30 to 50 degrees above the horizontal and said convex surface having a radius of convexity of approximately 3 to 7 inches and tapering to a maximum cord of approximately 3 to 7 inches.

8. A plow according to claim 3, said convex surface having a radius of convexity of approximately 3 to 7 inches and tapering to a maximum cord of approximately 3 to 7 inches.

9. A furrowing implement comprising bracket means for passing above soil, tilling means fixed to an intermediate portion of said bracket means and extending downwardly and forwardly therefrom to a lowermost point for breaking soil to a first depth and plowing means fixed to a rearward portion of said bracket means and extending downwardly and forwardly therefrom to a point above and rearward of said lowermost point of said tilling means for furrowing soil to a second depth above said first depth, further comprising a forward portion on said bracket means adapted for pivotal connection to a carrier for permitting rotation of said bracket means in relation to the carrier about an axis transverse to said bracket means and resilient means having one end connected to said bracket means rearwardly of said pivot means and having another end adapted for connection to the carrier with said tilling means and said plowing means in a normal furrowing alignment when said resilient means is relaxed for biasing said rearward portion of said bracket means downwardly in relation to the carrier when said resilient means is distorted, comprising a V-shaped slicing blade, a V-shaped lifting wedge and two curling plates, said slicing blade having leading edges extending rearwardly in a horizontal V from a forward tip thereof, said lifting wedge integrally sloping upwardly at a moderate angle from said slicing blade to a rearward portion thereof and said curling plates being joined to each other at first edges thereof and to said rearward portion of said lifting wedge at second edges thereof with said first edges sloping upwardly at a severe angle from said lifting wedge to a rearward portion of said plates and said second edges forming a V substantially paralleling said slicing blade V, each of said curling plates having a rearward edge and a concave portion of varying width and depth in a forward surface thereof, the width and depth decreasing in the direction from said rearward edge to a point adjacent said first edge.

10. A furrowing implement according to claim 9, said resilient means being resiliently distortable for upward rotation of said bracket means to permit said tilling means and said plowing means to clear obstacles thereto.

11. A furrowing implement according to claim 10, said resilient means comprising a compressible spring means.

12. A furrowing implement according to claim 11, said spring means having one end pivotally connected to said bracket means and having another end adapted for pivotal connection to the carrier.

13. A furrowing implement comprising bracket means for passing above soil, tilling means fixed to an intermediate portion of said bracket means and extending downwardly and forwardly therefrom to a lowermost point for breaking soil to a first depth and plowing means fixed to a rearward portion of said bracket means and extending downwardly and forwardly therefrom to a point above and rearward of said lowermost point of said tilling means for furrowing soil to a second depth above said first depth, further comprising a forward portion on said bracket means adapted for pivotal connection to a carrier for permitting rotation of said means in relation to the carrier about an axis transverse to said bracket means and resilient means having one end connected to said bracket means rearwardly of said pivot means and having another end adapted for connection to the carrier with said tilling means and said plowing means in a normal furrowing alignment when said resilient means is relaxed for biasing said rearward portion of said bracket means downwardly in relation to the carrier when said resilient means is distorted, said resilient means being resiliently distortable for upward rotation of said bracket means to permit said tilling means and said plowing means to clear obstacles thereto, said plowing means comprising a V-shaped slicing blade, a V-shaped lifting wedge and two curling plates, said slicing blade having leading edges extending rearwardly in a horizontal V from a forward tip thereof, said lifting wedge integrally sloping upwardly at a moderate angle from said slicing blade to a rearward portion thereof and said curling plates being joined to each other at first edges thereof and to said rearward portion of said lifting wedge at second edges thereof with said first edges sloping upwardly at a severe angle from said lifting wedge to a rearward portion of said plates and said second edges forming a V substantially paralleling said slicing blade V, each of said curling plates having a rearward edge and a concave portion of varying width and depth in a forward surface thereof, the width and depth decreasing from said rearward edge to a point adjacent said first edge.

* * * * *